Figure 1:
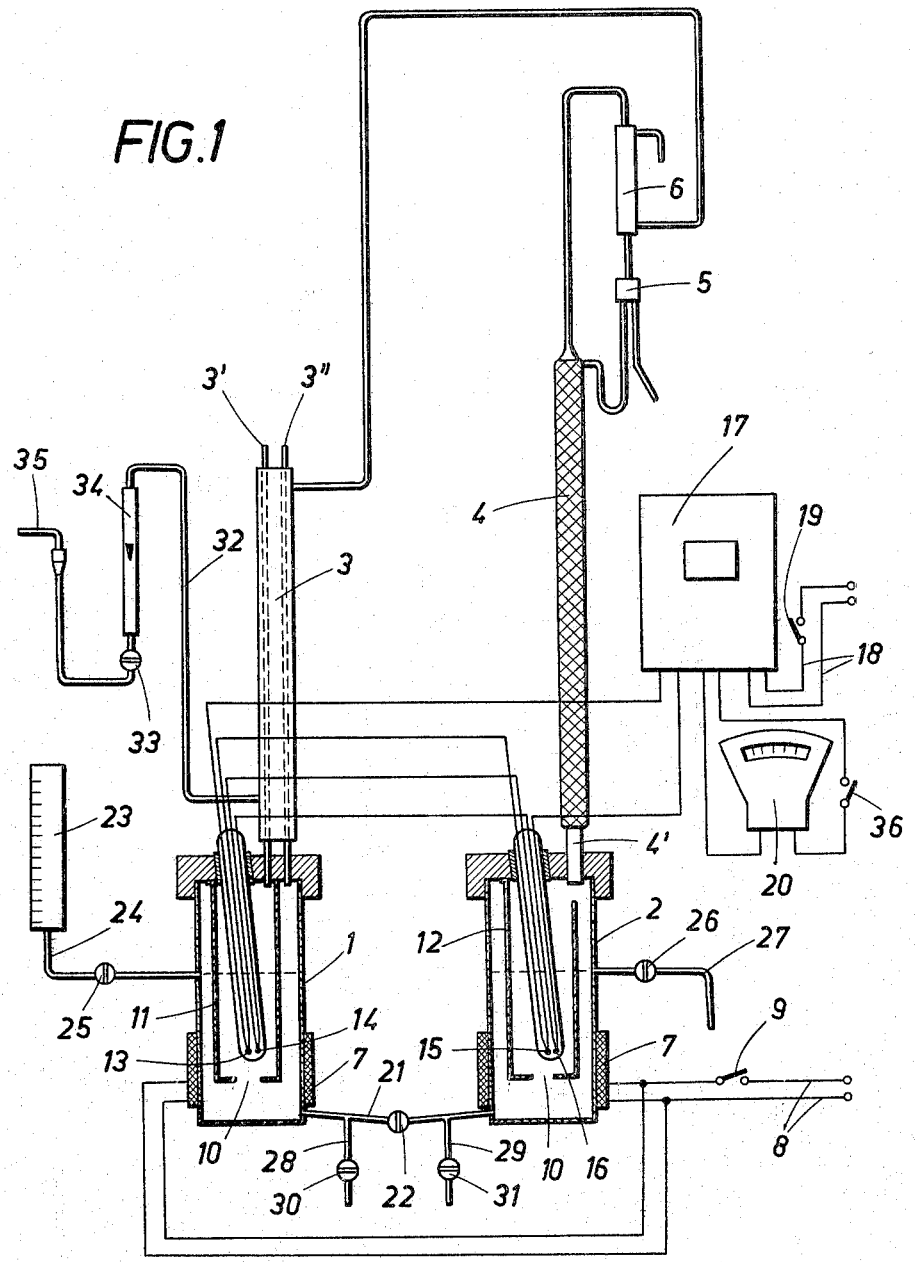

United States Patent Office 3,290,924
Patented Dec. 13, 1966

3,290,924
PROCESS AND APPARATUS FOR THE ANALYSIS
OF MIXTURES OF LIQUIDS
Heinrich Ebner, Linz, and Anton Enenkel, Traun, Upper
Austria, assignors to Heinrich Frings Maschinen- und
Apparatebau, Bonn, Germany
Filed Dec. 4, 1963, Ser. No. 334,959
11 Claims. (Cl. 73—61.3)

Various methods have been known for the quantitative determination of a component of a mixture of liquids. In most of these processes first, for example, by distillation, extraction, precipitation, adsorption, chromatography or other methods, a separation is brought about, whereupon the desired component is quantitatively determined on the basis of its particular chemical or physical characteristics. If, for example, ethyl alcohol has to be determined in mixture with water, organic acids, extract-substances and other components, as is particularly the case in crude, intermediate, and finished products of the alcohol-, yeast-, vinegar-, wine- and beverage-industry, then according to the processes hitherto known, the alcohol must be distilled off after neutralization of the mash, whereupon the alcohol content of the distillate is determined by means of a pyknometer, areometer, or tritrimetrically. All these processes are rather time-consuming and they cannot be used if the problem is to carry out the analysis of the liquid mixture semi-automatically or fully automatically, because the number of the necessary automatic steps is too large and the latter are too complicated in order to render possible a reliable and not too expensive apparatus.

It has also been known to determine the alcohol content of a mixture of liquids by comparing the boiling point with that of water. In this case, in the same apparatus, in direct succession, first the boiling point of the mixture of liquids and subsequently the so-called water-equivalent, i.e., the boiling point of pure water must be determined, which is necessary because the boiling points are dependent on the air pressure. From the difference of the boiling points of the liquid and of the water-value, the percent content of alcohol can be calculated by means of a suitably calibrated scale. It is usual to carry out this determination in a small apparatus provided with a mercury thermometer, in which the thermometer has an adjustable scale calibrated in percent alcohol and the zero point of which is adjusted to the boiling point of water in each case. The usefulness of this method, which is inaccurate by itself, is still further limited due to the fact that most of the alcohol-containing mixtures of liquids derived from alcohol-, yeast-, vinegar-, wine- and beverage-industry, consist not only of alcohol and water, which is a necessary condition in the method described. The numerous admixtures, particularly the organic acids and extractive substances, shift the boiling point to such an extent that this method becomes too inaccurate for the industrial practice. Furthermore, sudden changes of atmospheric pressure, which occur between determination of the boiling point of the mixture of liquids and the determination of the water-equivalent can result in noticeable errors.

Finally it is also known to determine the degree of saturation in solutions of solid materials, e.g. sugar, in solvents in such manner that at equal boiling pressure the boiling point of the solution is compared with the boiling point of the pure solvent by means of resistance thermometers; thereby admixed impurities in the solution can be compensated for manually by displacement of the zero point of the bridge connection. However, it has been hitherto not possible to extend the method of comparison of boiling points to the quantitative analytical determination of a liquid component in a mixture of two or several liquids having different boiling points and to attain thereby simultaneously a reliable, automatic elimination of the influence of the other liquids, impurities and admixed substances, as well as the elimination of the influence of the variation of atmospheric pressure.

All these difficulties can be avoided by proceeding in the manner described hereinafter according to the present invention, in which it is possible to determine values adapted to be converted into the desired analytical data for the quantitative determination of a component in a mixture of liquids, by measuring the temperature difference between the boiling point of the mixture to be analyzed and of a liquid used for comparison.

In carrying out one embodiment of the invention, the mixture of liquids is divided between two boiling vessels. One of these vessels is provided with a reflux condensor, while the second vessel is provided with a fractionating column, which has a condensor and a reflux divider; the samples in the two vessels are brought to boiling simultaneously and after distilling off the component to be analyzed from the second boiling vessel, the boiling temperatures of the mixtures present in the two boiling vessels are measured. The difference of these boiling temperatures is a basis for calculating the amount of the liquid ingredient to be determined.

In a modified procedure according to the invention the mixture of liquids is continuously supplied to a first boiling vessel which has an overflow and a reflux condenser and is brought to boiling therein; the same mixture of liquids is simultaneously and continuously supplied to a fractionating column provided with a condenser and a reflux divider, and arranged above a second, heated boiling vessel having an overflow; the contents of both boiling vessels is kept permanently at boiling temperature and the boiling temperature of the mixtures present in the boiling vessels are continuously measured. Thus, a continuous analysis can be carried out, in which in the fractionating column the liquid component to be analyzed, which boils at a lower or lowest temperature, is continuously distilled off immediately and only a mixture of liquids, which has been freed from this component, passes to the second boiling vessel and is discharged from there through the overflow. Thus, the liquid in the first boiling vessel will be permanently maintained at the boiling temperature of the unchanged total mixture of liquids, while the liquid in the second boiling vessel will adjust itself permanently to and be constantly maintained at the boiling temperature of a mixture of liquids, which is freed from the liquid component to be analyzed. The difference of these two temperatures can be continuously measured and converted into the percent values of the liquid component to be analyzed.

In a further modified and simplified procedure for continuous determination of values and for conversion according to the invention, the mixture of liquids is continuously supplied to a first boiling vessel which is provided with an overflow and a reflux condenser and is brought to boiling therein. The boiling mixture is passed from the first boiling vessel through an overflow to a fractionating column provided with a condenser and a reflux divider, and arranged above a second heated boiling vessel having an overflow. The contents of both boiling vessels is kept permanently at boiling temperature and the boiling temperatures of the mixtures present in the boiling vessels are continuously measured. In this case too, in the first boiling vessel the boiling temperature will be that of the unchanged total liquid mixture, while in the second boiling vessel the boiling temperature will be that of a liquid mixture freed from the liquid component to be analyzed. The difference of these two boiling points is continuously measured and converted into the corresponding analytical data.

It is also possible to omit the first boiling vessel and to introduce the liquid continuously, if necessary after preheating, directly into the upper part of the fractionating column; thereby the boiling point of the unchanged mixture of liquids can be measured at the entrance plate of the fractionating column. The temperature measurement which is carried out usually in the first boiling vessel, must then be displaced near the entrance plate of the column so that measuring of the temperature difference takes place between the entrance plate of the fractionating column and the boiling vessel arranged below the column. If measuring is carried out in this manner, then keeping the liquid current constant and the heating of the boiling vessel constant, require particular care, because any variation of these values causes a change in the temperature of the measuring place in the fractionating column.

The method according to the invention has in any case the advantage that the boiling points of two liquids or mixtures of liquids are compared, which differ from each other only in the content of the component to be analyzed, for example in the ethylalcohol content only, while they contain all other materials, impurities or admixtures in equal amounts, so that the exactness of the determination is not affected by such admixtures or the like. Due to the simultaneous measurement of the boiling points, the influence of sudden changes of the atmospheric pressure is safety eliminated.

Arrangements and devices for using and carrying out the process according to the invention will now be described in more detail in connection with the drawings which show such specific arrangements and devices by way of example and to which the invention is not limited.

Figure 2:
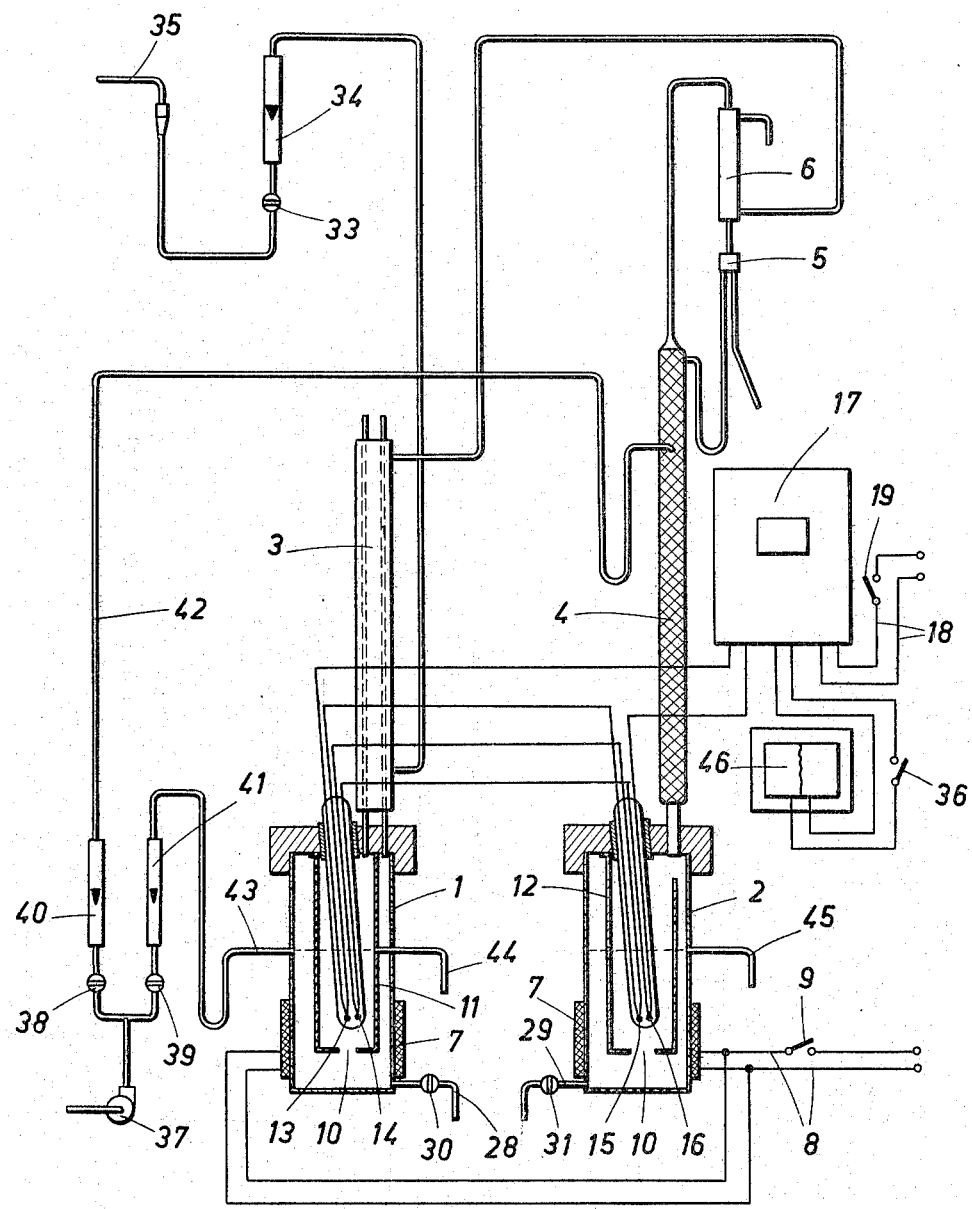
Figure 3:
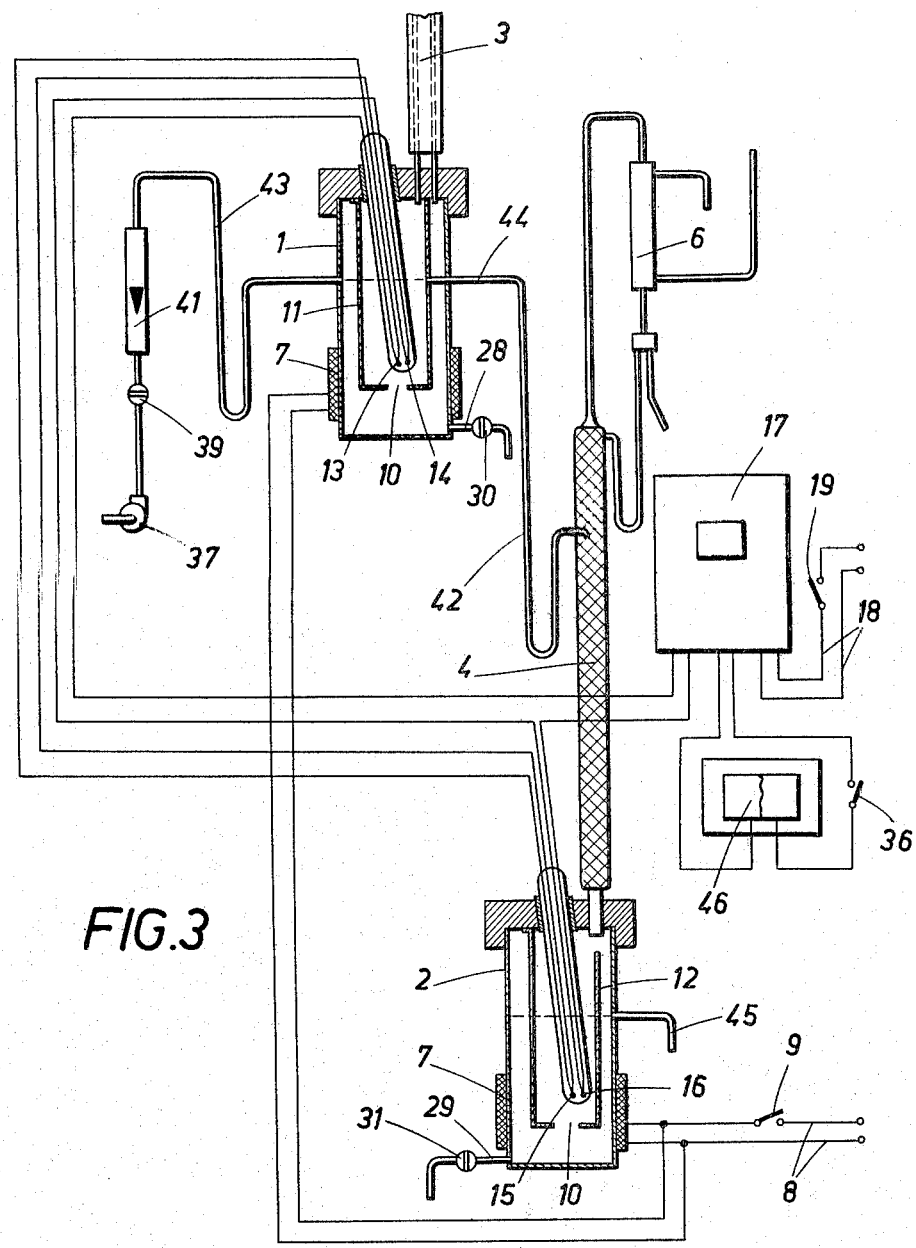
Figure 4:
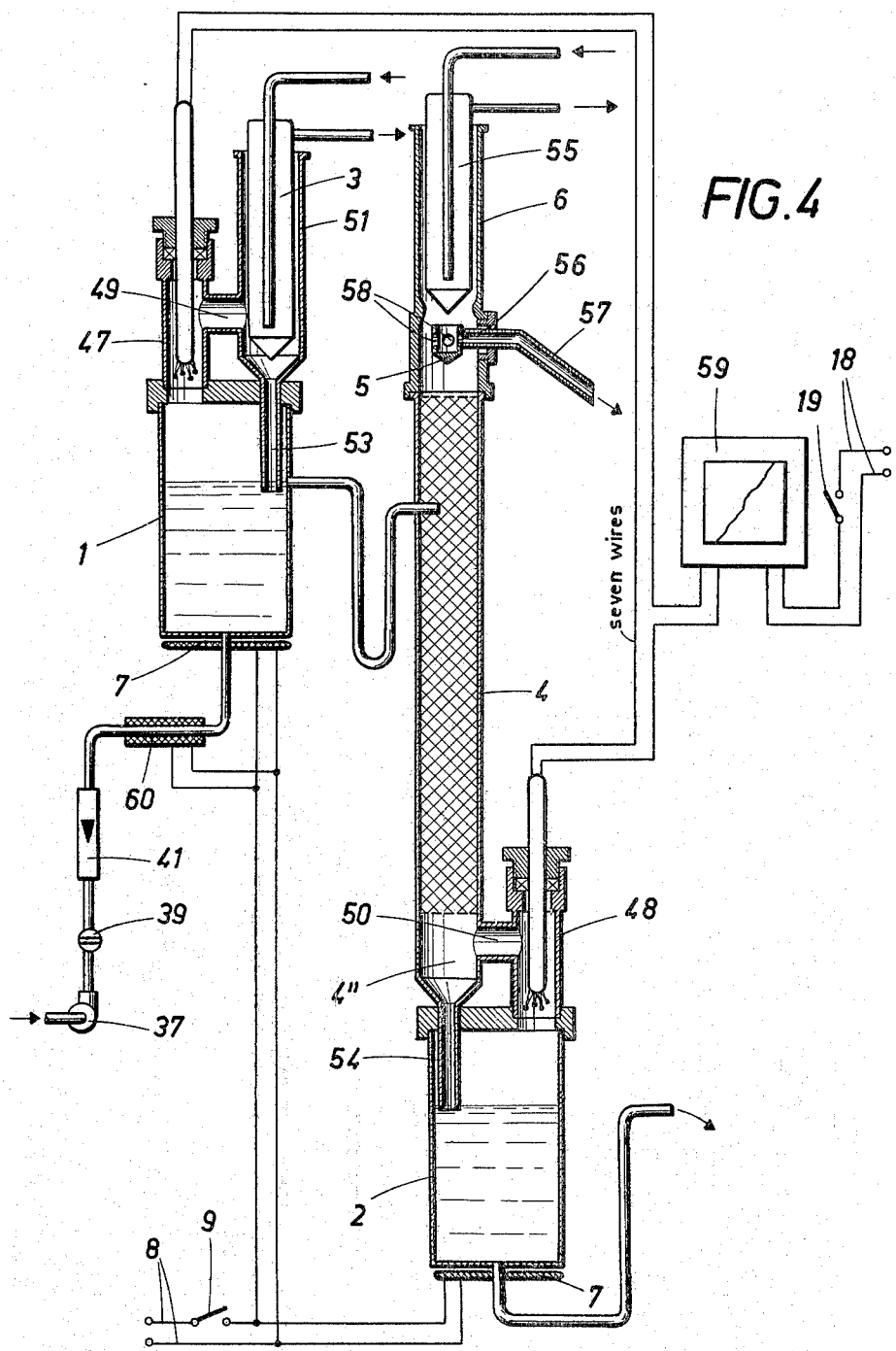

FIG. 1 diagrammatically illustrates a device for individual analyses, while FIGURES 2, 3 and 4 illustrate devices for continuous analyses, likewise diagrammatically.

The device according to FIG. 1 consists of two boiling vessels 1, 2, which have essentially the same volume and shape. The first boiling vessel 1, is provided with a reflux condenser 3 and the second boiling vessel 2 has a fractionating column 4, a reflux divider 5 and a condenser 6. The two boiling vessels 1 and 2 are heated from the outside by means of electrical heating jackets 7, which are connected over wires 8 by means of switch 9 with the electric-supply line. The two boiling vessels 1 and 2 are connected with each other by a conduit 21, which has a shut-off member 22. The introduction of the mixture of liquids takes place over a supply vessel 23 through a conduit 24 having a shut-off member 25. The boiling vessel 2 has an overflow tube 27 provided with a shut-off valve 26. Each of the boiling vessels 1, 2 is provided with a discharge tube 28, 29 and a shut-off member 30, 31. In each of the two boiling vessels 1, 2 a temperature-measuring device is arranged in thermal contact with the contents of the boiling vessels. The temperature-measuring instrument may be of any suitable conventional type, e.g. resistance thermometer or a thermo-couple. In FIG. 1 a thermo-couple having two pairs of soldering points 13, 14, 15, 16 is shown.

In order to reduce measuring errors which could occur by overheating the mixtures of liquids in the boiling vessels, each of the two boiling vessels 1 and 2 may be provided with a measuring vessel 11, 12 arranged within said boiling vessels and the temperature measuring points are then located in said measuring vessels. The measuring vessels 11, 12 are connected by openings 10 with the boiling vessels 1, 2. In order to prevent separation of the mixture of liquids in boiling vessel 1 and in measuring vessel 11, due to distillation, the vapors entering the reflux condenser 3 from both vessels 1 and 11, must be separately condensed so that the condensed liquid flows back to the same vessel from which it evaporated. Therefore, the measuring vessel 11 and boiling vessel 1 communicate with reflux condenser 3 by separate tubes 3' and 3". In boiling vessel 2 and measuring vessel 12 there is no danger of the separation by distillation because the liquid component to be analyzed has been already distilled off. The measuring vessel 12 and the boiling vessel 2 have, therefore, a joint connection 4' to fractionating column 4, so that the evaporating quantities of liquid can enter the fractionating column together and the reflux from the fractionating column to both vessels can take place jointly. In this arrangement, according to the invention the liquid in the boiling vessel serves as a liquid heating bath for the identical liquid located within the measuring vessel. As the temperature measuring points are located within the measuring vessel, by this arrangement overheatings which may occur in the boiling vessels are kept away with great safety from the temperature measuring points.

As shown in FIG. 4, the influence of overheatings can be eliminated also by measuring the boiling temperature in the vapor space above the boiling liquids. On top of the boiling vessel 1 a measuring tube 47 is arranged, which is connected by means of a vapor tube 49 with the conductor 51, in which the reflux condenser 3 is suspended and from which a tube 53 for guiding back the condensate into the boiling vessel 1, extends. On top of boiling vessel 2 likewise a measuring tube 48 is arranged, which is connected by means of a vapor tube 50 with the lower part 4" of the fractionating column 4 and from said lower part 4" of the fractionating column a tube 54 leads into boiling vessel 2. Due to this arrangement in the measuring tubes 47, 48 a continuous streaming of vapor from the boiling vessels 1, 2 over the vapor tubes 49, 50 into the condenser 51 and the lower part 4" of the fractionating column 4 takes place. The condensed liquid flows back through the return guide tubes 53, 54 to the boiling vessels 1, 2. By maintaining this continuous streaming of vapor, it is possible to measure the boiling temperatures of the liquids boiling in the boiling vessels 1, 2 with greatest accuracy by means of thermo-couple or other temperature measuring instruments.

In order to obtain a directly readable indication of the analytical value, according to a further embodiment of the invention a thermo-couple shown in FIGS. 1, 2 and 3 is used as temperature measuring instrument; for taking up the measuring value at the two measuring points arranged in both boiling vessels, at least two soldering points 13, 14 and 15, 16 of a thermo-couple are used. The soldering points 13, 15, 14, 16 are connected in series. The thermo-couple which may also have more than two soldering points, is connected by its free ends to an amplifier 17, which over wires 18 including switch 19 is supplied with current from a distributing system. The amplifier is connected with an electric indicating instrument 20, in which in conformity with the temperature difference of the boiling points millivolts, milliamperes, or directly percent of the liquid component to be analyzed, for example vol.-percent alcohol can be read. For the wires of the thermo-couple preferably copper and Constantan are used, which are coated with a plastic material or glass for protection from corrosion, in such manner that a good transmission of heat is assured. By the connection of the soldering points in series, the thermo-potential, which is low per se, is multiplied and is subsequently rendered suitable by the amplifier for an instrument with direct indication. If desired, this value can be passed to a control organ.

According to FIG. 4, four soldering points are used for each temperature measuring place; thereby no amplifier is used and the thermo-potential is conducted directly to a sensitive compensograph 59, which is connected by means of wires 18 over the switch 19 to the electric supply net. Furthermore, it is also possible to use as temperature measuring instrument two resistance thermometers, the measuring value difference of which is conducted over a bridge connection to an amplifier and an electric indicating instrument.

The arrangement for individual analyses according to the invention can be further modified also in such manner that in FIG. 1 after the amplifier 17 a dotted line recorder is switched in instead of the electric indicating instrument 20, the release mechanism of which is connected with a signal giving timer, both not shown in the drawing. In this arrangement the charging of the mixture of liquids, the operation of the shut-off organs, the adjustment of the amount of cooling water and the switching on of the heating as well as of the amplifier, is like in the other arrangements carried out by hand, while the timer releases—after a manually adjustable time interval, which corresponds to the duration of distillation of the liquid to be analyzed—the writing of the analysis-point and the giving of an optical and/or acoustic signal in order to signal the end of the determination. By this simple way, the analysis test does not need any watching except starting the procedure and reading the result. There is no loss of time between two tests because another analysis may be started immediately after the signalizing of the end.

In order to carry out individual analyses in the device shown in FIG. 1, first at closed position of the shut-off organ 25 a certain amount of mixture of liquids is supplied into vessel 23. Subsequently, at closed position of the shut-off organs 30, 31 the valves 26, 22 and 25 are opened. The mixture of liquids rinses and fills both boiling vessels up to the predetermined height; thereby, the excess flows away through overflow-pipe 27. Now, the valves 25, 22 and 26 are closed again and subsequently by means of switches 19 and 9 the amplifier 17 and the heaters 7 are switched on. The reflux condenser 3 and the condenser 6 are connected over a conduit 32, which contains an adjusting organ 33 and a flowmeter 34, to a cooling water conduit 35. Upon reading the flowmeter 34, the necessary amount of cooling water is now adjusted on the adjusting organ 33. The fractionating column 4 is filled with Raschig rings or other filling bodies, or may be of other known construction. The liquid present in the two boiling vessels 1 and 2 starts to boil soon and heats simultaneously the liquid in the measuring vessels 11 and 12 to boiling. The liquid in boiling vessel 1 and in the measuring vessel 11 boils without change at the reflux condenser 3; thereby a constant boiling point is quickly attained. In boiling vessel 2 and measuring vessel 12 the lowest boiling liquid component, e.g. ethyl alcohol, starts to distill off after correspondingly advanced heating, at correspondingly preadjusted reflux divider 5, in rather pure condition. As soon as the liquid to be determined is completely removed from boiling vessel 2 and measuring vessel 12, the slowly increasing boiling point in measuring vessel 12 reaches its maximum and becomes constant. At this time indicating instrument 20 is switched on by means of switch 36 and the indication is read. After the analysis is carried out, the switches 9 and 36 and the discharge valve 30 and 31 are opened whereupon the apparatus is ready for a new analytical determination.

The arrangement according to the invention can be constructed for carrying out continuous quantitative analyses in such manner with means for the continuous supply of the mixture of liquids that in accordance with FIG. 2 a pump 37 for supplying the mixture is connected with a forked pipe line. One branch line 42 discharges over an adjusting organ 38 and a flowmeter 40 into the fractionating column 4, while the second branch pipe 43 leads over an adjusting organ 39 and a flowmeter 41 to the boiling vessel 1. The boiling vessels 1 and 2 have two overflow tubes 44 and 45 arranged at their levels of the liquid.

The continuous supply of the mixture of liquids can take place in a simplified manner according to FIG. 3. Thereby the pump 37 for supplying this mixture presses the latter through tube 43 over a regulating organ 39 and a flowmeter 41 into boiling vessel 1. The boiling vessel 1 is connected at its liquid level with a tube 44, which discharges below this level into fractionating column 4. Boiling vessel 2 has an overflow tube 45 at the height of its desired liquid level.

In order to carry out automatically the continuous analysis, according to a further embodiment the apparatus is provided with a device for the continuous registration of the analysis results, by connecting to the amplifier an automatic line-recorder 46. In this manner it becomes possible to write down the amount of the component to be analyzed of the mixture of liquids over extended periods of time.

If relatively large changes of the component to be analyzed in the mixture of liquids have to be expected and, therefore, elimination of the usually unessential time lag between taking the sample by pump 37, e.g. from a fermenting vessel, and the termination of analysis, is desirable, the apparatus is provided with a device, by which a quick continuous supply of the mixture of liquids is possible. As shown in FIG. 4, this device consists of a preheater 60 for preheating the liquid mixture to be supplied for analysis, to be inserted between the flowmeter 41 and boiling vessel 1.

In order to carry out continuous analyses in the apparatus illustrated in FIG. 2, the mixture of liquids is continuously pressed by pump 37 into boiling vessel 1 and fractionating column 4. By means of regulating organs 38 and 39 in the flowmeters 40 and 41 a slow, constant flow is adjusted. Through tube 43, the mixture of liquids enters boiling vessel 1 and from there through opening 10 measuring vessel 11 and leaves this part of the apparatus through overflow 44. The tube 42 discharges into the upper part of fractionating column 4. Heating means 7 of the boiling vessels remain permanently switched on by means of switch 9. In boiling vessel 1 a constant boiling temperature of the mixture of liquids, which boils without change at reflux condenser 3, rather quickly adjusts itself. The liquid component to be analyzed distills off continuously through reflux divider 5, while the residual liquid mixture which has been freed from this component passes through fractionating column 4 to boiling vessel 2 and measuring vessel 12, where a boiling temperature corresponding to this composition adjusts itself. The residual mixture of liquids leaves this part of the apparatus continuously through overflow 45. By means of the soldering points 13, 14 and 15, 16 of the thermo-couple, the difference between the boiling points of the unchanged liquid mixture and the mixture freed from the component to be analyzed is measured continuously and transmitted as thermo-potential continuously over the amplifier 17, to the automatic line-recorder 46—which, like the amplifier—is permanently switched on.

The apparatus for continuous analysis can be simplified in the manner shown in FIG. 3. In this case, the liquid mixture supplied by pump 37 is supplied over tube 43 only to boiling vessel 1, after adjustment of the amount in flowmeter 41. The boiling mixture flows from measuring vessel 10 through overflow 44 automatically to the upper part of fractionating column 4, which is arranged at a lower position. Separation of the liquid component to be analyzed takes place there in the above described manner. The mixture of liquids freed from said component leaves the apparatus through overflow 45 arranged on boiling vessel 2. Measurement and writing down of the temperature difference takes place in the same manner as according to FIG. 2. This apparatus has the advantage of using a smaller amount of liquid for analysis.

In order to obtain a satisfactory operation of the apparatus, a constant reflux ratio is necessary, which must be adjustable to the mixtures to be analyzed. Therefore, in the apparatus shown in FIG. 4, on top of the fractionating column 4 a condenser cylinder 6 is arranged, in which the reflux condenser 55 is suspended, the lower point of which is arranged above the reflux divider 5. This reflux divider 5 consists of a small receptacle which is open on top and is exchangeably fastened to condenser cylinder 6. The interior of this receptacle is connected through an opening 56 with the discharge tube 57 for the distillate and through at least one opening 58 of equal size, arranged at equal level with the interior of the condenser. The liquid condensed in reflux condenser 55 flows into the reflux divider 5 and flows out from there uniformly through all openings, so that the ratio of the number of openings 58 discharging into the interior of the condenser to the one opening discharging the distillate through tube 57 determine the reflux ratio. By exchanging the reflux divider, the reflux ratio necessary for the analysis of a certain substance, can be easily adjusted. As long as the same reflux divider is used, the reflux ratio remains constant.

The process and apparatus according to the present invention have the advantage—which is particularly valuable for the industrial practice—of continuously determining in chemical or biochemical processes the lower or lowest boiling liquid component present in varying proportions, manually or automatically. It will be appreciated that this essentially simplifies supervision and control of the process. The result of the analysis can be utilized for automatically controlling the process. Thus, for example, in the vinegar fermentation on shavings as well as in submerged vinegar fermentation the alcohol content of the fermenting mash, can be determined intermittently or continuously. The attaining of an alcohol content of about 0.2% by volume in the fermenting vinegar mash, can be used for the start of discharging the finished vinegar with subsequent recharging of fresh mash. In continuous submerged vinegar fermentation operating in a through-flow system, it is possible to determine and write down the alcohol content of vinegar produced and to use the value determined for controlling the flow-rate of the mash to be fermented through the fermenting apparatus in such manner that the alcohol content of the vinegar produced is in the range between 0.01 and 0.30% by volume. In this way, a harmful effect on the bacteria due to lack of alcohol and disturbance of the fermentation are avoided and, on the other hand, unnecessary alcohol losses due to unfavorable yield are prevented.

In the production of yeast, the alcohol content of the wort can be likewise continuously determined and registered automatically and the result of the analysis can be utilized for controlling the amount of air and the supply of wort. Furthermore, in any industrial alcoholic fermentation, for example in the production of beer, it is possible to automatically determine and register the increase of alcohol content and to utilize the result of analysis for the desired controlling of the process, e.g. by modifying the fermentation temperature.

It will be understood that the method and apparatus of the invention is not limited to the examples mentioned above, and can be used for the intermittent or continuous analysis of the lower or lowest boiling liquid component in any mixture of liquids. For example, the amount of methylalcohol, propylalcohol, acetone, or methylethylketone can be determined in mixtures with water. It is further possible to analyze semi-automatically or fully automatically water in mixtures with acetic acid, benzene in mixtures with toluene or xylene, chloroform in mixtures with benzene, benzene in mixtures with acetic acid, ethylacetate in mixtures with acetic acid and many other liquid mixtures.

It is, of course, also possible to determine by the process of the invention in a mixture of liquids, which consists of several components, not only the lowest boiling component, but also the next higher boiling component. In this case the boiling points of the mixture, which has been freed from one, two or more components, and the boiling point of the unchanged, original mixture of liquids, are measured. The differences of the boiling temperatures can be simply converted into the individual amounts of components.

Example 1

In an apparatus according to FIG. 1 for individual analyses having two copper-constantan soldering points per measuring point, and a photoelectric amplifier, the $C_2H_5OH$ content of fermenting beer is determined. Each of the boiling vessels 1 and 2 has a volume of 150 ml. A sample of 200 ml. is supplied to the apparatus through supply vessel 23. After rinsing and overflow, 70 ml. of the sample remain in each boiling vessel. Heating is adjusted to 120 watt for each boiling vessel and the amount of cooling water is adjusted to about 30 liters per hour. The liquids start to boil after about 6 minutes and after 10 minutes the alcohol starts to distill off at the reflux divider 5. After about 15 minutes from switching on the apparatus, on the milliamperemeter 20 which is switched on, a current of 1930 microamperes can be read. According to a previously prepared calibrating curve, the ethylalcohol content of the sample amounts to 2.00 vol.-percent. At a precision of the instrument of 1% of the total deflection, at a range of 3 milliamperes, an accuracy of 0.03 vol.-percent is attained.

Example 2

Into the apparatus described in the preceding Example 1, 200 ml. of a mixture of acetone and water is introduced. After 15 minutes, the instrument shows a constant deflection of 2130 microamperes. From a previously prepared calibrating curve it can be calculated that the analyzed mixture contains 1.00% by weight of acetone, at a precision of 0.01%.

Example 3

In the industrial submerged vinegar fermentation the alcohol content of the fermenting mash changes in each fermentation cycle from about 5% by volume directly after charging of fresh mash, up to about 0.2% by volume when the finished vinegar is discharged. If an apparatus according to FIG. 4 for continuous analysis and having dimensions equal to those described in Example 1 is connected to such fermenting system and at each temperature measuring point four soldering points of copper-constantan are used, the progress of fermentation can be directly observed on a compensograph 59. The obtaining of a concentration of 0.2% by volume in the fermentation solution automatically releases the discharging of finished vinegar with subsequent charging of fresh mash. 0.2% by volume of alcohol still yield a thermopotential of 32 microvolts, which—at a maximum deflection of 1000 microvolts in the compensograph—are still indicated clearly and with a precision which is sufficient for preventing decrease of the ethylalcohol concentration to zero in the fermenting vinegar.

Example 4

In industrially concentrating a mixture of ethylacetate, water, and acetic acid, obtained, for example, in the extraction of acetic acid from crude vinegar with ethylacetate, the water and ethylacetate must be subjected to azeotropic distillation, in order to obtain the acetic acid in anhydrous condition. The excess of ethylacetate distilling at the end of the process must be reliably removed from the acetic acid. By means of an apparatus for continuous analysis, according to FIG. 2, a simple permanent control can be obtained, by connecting the apparatus to the still of the concentrating column. It is preferred to apply in this case to each measuring point 4 copper-constantan soldering points. 0.10% by weight of ethylacetate in the acetic acid yield a deflection of 100 microamperes. This deflection can be utilized for automatically opening the supply of steam to the concentrating column in such manner that the ethylacetate is completely removed from the acetic acid in the still.

What we claim is:

1. Process for the quantitative determination of the lowest boiling component of a mixture of liquids, by measuring the difference between the boiling temperatures of said mixtures of liquids and a liquid used for comprising continuously supplying a first sample of said mixture of liquids to constant boiling and refluxing all vapors formed to said first sample; simultaneously heating a second sample of said mixture of liquids to constant boiling under equal pressure and distilling off from said second sample said lowest boiling component by fractionation and refluxing all remaining vapors formed during said constant boiling to the distillation residue thus formed of said second sample so that said second sample will then consist of the original mixture of liquids minus said lowest boiling component, and measuring the difference between the boiling temperatures of said distillation residue of the second sample and of said unchanged mixture of liquids of the first sample.

2. A process for the quantitative determination of the lowest boiling component of a mixture of liquids by measuring the difference between the boiling temperatures of said mixture and of a liquid used for comparison, comprising continuously supplying a first sample of said mixture of liquids to a first distillation means and a second sample of said mixture of liquids to a second distillation means; continuously heating said first sample to constant boiling and continuously refluxing all vapors formed to said first sample; simultaneously and continuously heating said second sample to constant boiling and continuously distilling off said lowest boiling component by fractionation and continuously refluxing all remaining vapors to a distillation residue of said second sample; said distillation residue consisting then of said mixture of liquids minus said lowest boiling component; continuously heating said distillation residue to constant boiling; and continuously measuring the difference between the boiling points of the distillation residue of said second sample and of said first sample; and continuously taking off from said first and second distillation means the liquids in accordance with their continuous supply.

3. Process for the quantitative determination of the lowest boiling component of a mixture of liquids by measuring the difference between the boiling temperatures of said mixture of liquids and of a liquid used for comparison, comprising continuously supplying said mixture of liquids to a first distillation means, continuously heating it to constant boiling while continuously refluxing all vapors formed to said unchanged mixture of liquids; continuously discharging said unchanged mixture of liquids from said first distillation means in accordance with its continuous supply; continuously supplying said mixture of liquids to a second distillation means; continuously distilling off the lowest boiling component by fractionation from said second distillation means and continuously refluxing all remaining vapors in order to form a distillation residue in said second distillation means, said distillation residue consisting of said mixture of liquids minus the lowest boiling component; continuously heating said distillation residue in said second distillation means to constant boiling; continuously measuring the difference between the boiling temperatures of said distillation residue in said second distillation means and of said unchanged mixture of liquids in said first distillation means, and continuously taking off said distillation residue from said second distillation means in accordance with the continuous supply of the mixture of liquids.

4. Apparatus for the quantitative determination of the lowest boiling component of a mixture of liquids by measuring the difference between the boiling temperature of said mixture of liquids and of said mixture of liquids freed from the lowest boiling component, comprising a first and a second boiling vessel of substantially equal shape and volume; the two boiling vessels being connected with each other by a conduit which has a shut-off member, a supply vessel having a conduit and a shut-off member leading to said first boiling vessel, said supply vessel, conduits and shut-off member serving for filling both boiling vessels with the mixture of liquids; each of the two boiling vessels being provided with heating means and discharge means with shut-off members; said first boiling vessel carrying a reflux condenser and said second boiling vessel carrying a fractionation column provided with a reflux condenser and a reflux divider; each of said first and second boiling vessels housing in its interior a temperature measuring device in thermal contact with the contents of the boiling vessels.

5. Apparatus for the quantitative determination of the lowest boiling component of a mixture of liquids by measuring the difference between the boiling temperature of said mixture of liquids and of said mixture of liquids freed from the lowest boiling component, comprising a first and a second boiling vessel of substantially equal shape and volume, the first boiling vessel having a conduit for the supply of the mixture of liquids and an overflow; the second boiling vessel having an overflow; each of the two boiling vessels being provided with heating means and discharge means with shut-off members; said first boiling vessel carrying a reflux condenser and said second boiling vessel carrying a fractionation column provided with a conduit for the supply of the mixture of liquids, a reflux condenser and a reflux divider; each of said first and second boiling vessels housing in its interior a temperature measuring device in thermal contact with the contents of the boiling vessels; means for securing continuous and constant supply of the mixture of liquids to the supply conduits of the first boiling vessel and of the fractionation column.

6. Apparatus for the quantitative determination of the lowest boiling component of a mixture of liquids by measuring the difference between the boiling temperature of said mixture of liquids and of said mixture of liquids freed from the lowest boiling component, comprising a first and a second boiling vessel of substantially equal shape and volume, the first boiling vessel having a conduit for the supply of the mixture of liquids and an overflow; the second boiling vessel having an overflow; each of the two boiling vessels being provided with heating means; said first boiling vessel carrying a reflux condenser and said second boiling vessel carrying a fractionation column provided with a conduit for the supply of the mixture of liquids, a reflux condenser and a reflux divider; each of said first and second boiling vessels housing in its interior a temperature measuring device in thermal contact with the contents of the boiling vessel; said overflow of the first boiling vessel being connected by a U-shaped conduit with said supply conduit of the fractionation column; means to secure continuous and constant supply of the mixture of liquids to the supply conduit of the first boiling vessel.

7. Apparatus as claimed in claim 4, comprising two measuring vessels with an opening each, housed by each of the first and second boiling vessels in their interior; the first boiling vessel and the measuring vessel housed by it communicating with the reflux condenser mounted on the first boiling vessel by separate tubes, the second boiling vessel and the measuring vessel housed by it having a joint connection to the fractionation column mounted on the second boiling vessel, in order to reduce measuring errors by overheating.

8. Apparatus as claimed in claim 4, comprising a first measuring tube arranged on top of the first boiling vessel, a first condensate collector having a first condensate return tube extending into the first boiling vessel, said first measuring tube being connected by a first vapor tube with said first condensate collector, a reflux condenser being suspended in said first condensate collector; a second measuring tube arranged on top of the second boiling vessel connected by a second vapor tube to the second condensate collector in the lower part of the fractionation column, said second condensate collector having a second condensate return tube extending into the second boiling vessel, in order to reduce measuring errors by overheating.

9. Apparatus as claimed in claim 4, having means for obtaining a constant reflux ratio in the fractionation column, said means consisting of a condenser cylinder in which the reflux condenser is suspended, the lower point of which the reflux condenser is suspended, the lower point of which is arranged above a reflux divider, said reflux divider consisting of a receptacle which is open on top and is exchangeably fastened to the condenser cylinder and the interior of said receptacle is connected through a first opening with a discharge tube and by at least one second opening of equal size arranged at equal level, with the interior of the condenser.

10. Apparatus as claimed in claim 4, comprising a temperature measuring device in each of the first and second boiling vessels consisting of a thermocouple with at least two soldering points in each of the temperature measuring points in the two boiling vessels; the terminals of the thermocouple being connected to a recorder.

11. Apparatus as claimed in claim 6, with a preheater inserted in the supply conduit to the first boiling vessel.

References Cited by the Examiner

UNITED STATES PATENTS

| | | | |
|---|---|---|---|
| 1,747,742 | 2/1930 | Stein | 73—53 |
| 3,081,619 | 3/1963 | Pappas | 73—53 X |
| 3,247,708 | 4/1966 | Luther | 73—53 |

DAVID SCHONBERG, *Primary Examiner.*